Feb. 21, 1956  A. R. CLARK  2,735,277
COMBINATION PANEL AND REFRIGERATION UNIT
Filed June 3, 1954
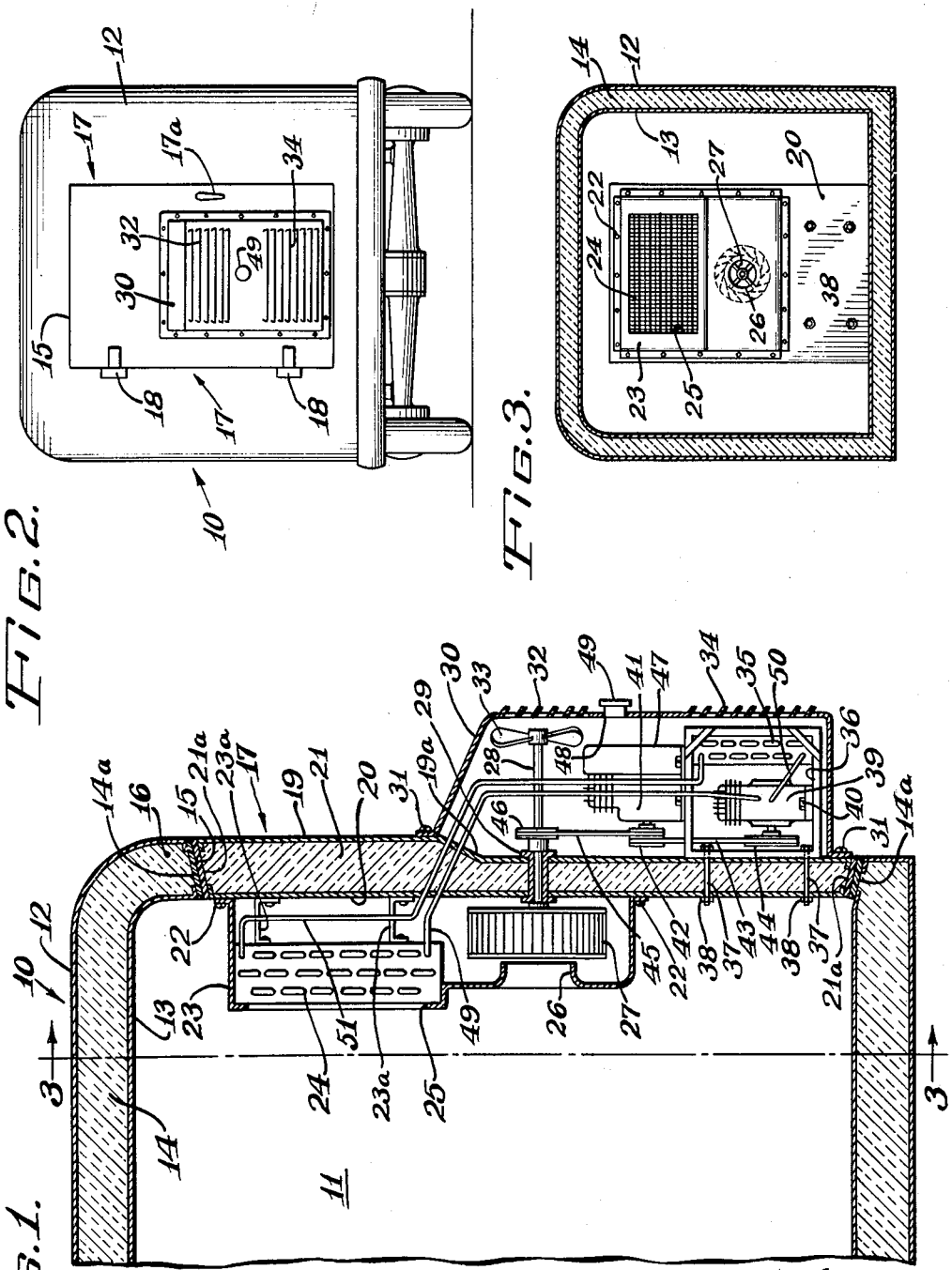
Inventor:
Adna R. Clark
Paul O. Pippel
Atty.

United States Patent Office 2,735,277
Patented Feb. 21, 1956

2,735,277

COMBINATION PANEL AND REFRIGERATION UNIT

Adna R. Clark, Evansville, Ind., assignor to International Harvester Company, a corporation of New Jersey Application June 3, 1954, Serial No. 434,187

5 Claims. (Cl. 62—117)

This invention relates to refrigerating apparatus but is more particularly concerned with refrigerating apparatus used in association with an automotive vehicle.

Heretofore various types of automotive vehicles have been equipped with refrigerating apparatus, which, in the case of trucks, was for the purpose of refrigerating cargoes carried therewithin, and, in the case of passenger vehicles, for cooling the air circulated therewithin to provide greater comfort for the vehicle's passengers. The present invention, however, is more particularly directed to automotive trucks wherein relatively low temperatures must be maintained over long periods of time in order to preserve the cargo contents thereof, rather than to passenger vehicles wherein refrigerating requirements are intermittent, less severe, and space limitations are more flexible.

In an automotive truck it is recognized that cargo space is of paramount importance because the best possible use thereof must be made at all times in order to most economically operate the vehicle and thus make the profit for which it was intended. In addition, in the larger cities, particularly, where modern traffic conditions continue to grow daily more congested, delivery vehicles are usually built as small as possible to facilitate maneuverability thereof in traffic; hence the demands for maximum utilization of cargo space are further emphasized. Because of the limitations imposed by such space restrictions the prior art structures heretofore provided for vehicles of this character have not been entirely acceptable. Furthermore, in some of these structures the individual components of the refrigeration apparatus were separated and disposed at different locations throughout the vehicle in order to avoid usurping valuable cargo space, but as a result such arrangements were responsible for introducing other equally objectionable disadvantages because of the inaccessibility of the unit or components thereof for repair or replacement.

The present invention, therefore, is directed to the provision of refrigerating apparatus which is fashioned into a compact, self-contained unit suitable for installation in an automotive vehicle in such manner as to overcome the objections and drawbacks of prior refrigeration apparatus when utilized for similar purposes.

A principal objection of the present invention is to provide a simple and relatively compact arrangement for mounting refrigeration apparatus in an automotive vehicle.

A further object is to provide means for assembling and mounting refrigeration apparatus into a self-contained arrangement suitable for use with automotive vehicles and which when so installed is readily accessible for repair and the like.

A still further object is to provide refrigeration apparatus that is readily accessible when mounted in a delivery-type automotive vehicle.

A yet still further object is to provide a unitary panel structure wherein refrigerating apparatus components are mounted on an insulated panel-like wall member and such member, in turn, functions as an access door to the cargo space of an automotive truck.

A further object is to provide a compact, self-contained assembly wherein the individual components of a refrigerating apparatus unit are mounted on a panel-like insulated wall member and such wall member is adaptable for cooperating with other wall members for enclosing a space to be cooled by the said refrigeration apparatus.

A further important object is to provide a combination removable panel and cooling unit structure wherein refrigerating apparatus is mounted on a panel and such panel is adapted to cooperate with other panels to enclose a space to be cooled by the refrigerating apparatus.

Another important object is to provide an access door for the cargo space of a refrigerated truck wherein the door is fashioned as a double walled thermally insulated structure having mounted thereon refrigerating apparatus that is removable therewith as a unitary structure and wherein the refrigerating apparatus so mounted is suitable for cooling the cargo space within the body of the truck.

Another object is to provide a removable mounting for a truck refrigeration unit wherein the refrigerating apparatus is mounted on a panel and is removable therewith as a unit.

The foregoing and other objects and features of the invention will become apparent as the disclosure is more fully made in the following detailed description of a preferred embodiment of the invention as illustrated in the accompanying sheet of drawings in which:

Fig. 1 is a vertical sectional view taken through the rear portion of a refrigerated truck body into which the present invention has been incorporated.

Fig. 2 is a rear elevation of a delivery truck that has the present invention installed therein.

Fig. 3 is a sectional view taken on line 3—3 of Fig. 1 and shows a view from inside the cargo compartment of the truck.

In the foregoing drawings there is depicted an installation which shows the present invention incorporated in a multi-stop delivery type of automotive truck, but it will be appreciated that the assembly is not so limited and may be used in other type vehicles as well. Furthermore, it may also be used in stationary structures such as to form the door or wall portion of an immobile compartment or space to be cooled. However, the illustration depicted in the attached drawings shows a preferred form and application of the invention and hence the detailed description to follow is more specifically directed to that particular embodiment.

A standard delivery type vehicle is provided with an insulated body portion, represented generally by the numeral 10, which encloses a cargo-carrying space 11 therewithin. Said body is formed in the conventional manner with an outer shell 12, an inner shell 13, thermal insulating material 14 therebetween, and having a non-metallic breaker strip 14a connecting said shells along the marginal edges thereof. An access opening 15 in one wall of the body permits ingress and egress to said cargo space, and although, as illustrated in the preferred embodiment, said opening is shown as being in the rear wall or deck 16 of the truck body it will be understood that such might well be provided in any one of the other walls thereof without departing from the spirit of the invention.

In accordance with the particular teachings of the present invention the access opening 15 may be closed with a door or closure member, indicated generally by the numeral 17, hingedly mounted by suitable readily removable means such as the separable hinges 18. Such door or closure panel 17 may be fashioned with an outer shell or wall member 19, and inner shell or wall member 20 with thermal insulating material 21 therebetween, and having a non-metallic breaker strip 21a connecting said walls together along the marginal edges thereof. Said door or closure member, preferably, is formed into a relatively rigid thermally insulated wall-like structure that is rotatable to close the opening 15, but which may be easily removed therefrom by means of the separable or demountable hinges 18. A handle 17a of conventional form may be provided to facilitate movement of said door. Although, as illustrated, the outer wall member 19 is provided with a recessed area 19a in order to make the assembly more compact it will be understood that this is not a limiting factor since such wall member may also be flat and in one plane like the inner wall member 20 without deviating from the concept of the invention. Positioned on the inner wall 20, of the insulated panel-like door structure 17, and suitably secured thereto as by the conventional bolt or screw means 22, is a shroud-like casing or housing 23 which surrounds a refrigerant evaporator 24, in turn, fixedly mounted therewithin by any well known means such as the brackets 23a. An opening 25 in said shroud adjoins the evaporator 24 and is dimensioned so as to expose substantially the entire area of one cooling surface of said evaporator to the cooling compartment 11. A second opening 26 in said shroud leads into the axial inlet of a centrifugal type blower wheel 27 which is mounted on a shaft 28 journalled in a bearing 29 in said door panel structure.

On the outer wall 19 of the insulated panel-like structure 17 there is positioned a bonnet-like cabinet or housing 30 which may be affixed thereto by any suitable means such as the conventional screws or bolts 31. A louvered opening 32 in said housing is disposed opposite a fan 33, preferably, of the propeller-type mounted on shaft 28 on the end thereof opposite from that upon which is mounted the blower wheel 27. A second louvered opening 34 in the housing 30 is provided adjoining a refrigerant condenser 35 that is fixedly supported by a frame-like bracket member 36 which, in turn, is securely mounted on said insulated panel structure by suitable means such as the bolts 37 and nuts 38.

A refrigerant compressor 39 positioned behind the condenser 35 is also mounted on the frame 36 and may be secured thereto by conventional means such as the bolts 40 (only one of which is shown) disposed on either side thereof. Mounted by any well known means on the frame 36 above the compressor 39 is a compressor driving engine 41 which, preferably, is so positioned that a double pulley 42 on the drive shaft thereof may be drivingly connected by the belt 43 and pulley 44 to the compressor 39, and by the belt 45 and pulley 46 to the fan shaft 28. Although the preferred embodiment of the invention envisages an air-cooled internal combustion engine for the purpose, it will be appreciated that a water cooled engine, or any other well known type of motive power that is self-contained, might be used with equal adaptability to drive the compressor as well as the fans 27 and 33. A fuel tank 47 may also be positioned on the frame 36 adjoining the engine and be suitably secured to said frame by conventional affixing means. A hand hole 48 covered with a suitable cap 49 may be provided for purposes of gaining ready access to the fuel tank 47 for replenishing the contents thereof without having to remove the exterior bonnet or housing 30. Refrigerant-carrying conduits 49 and 50, interconnect the compressor 39, respectively, with the evaporator 34, and condenser 35, while conduit 51 interconnects said evaporator and condenser.

In operation the driving engine 41, which is self-contained and requires no external connections for motivating power, functions to operate the compressor 39 for circulating refrigerant through the system in conventional fashion, while at the same time driving the fan shaft 28 and thus rotating the blower wheel 27 and fan 33. As the fan 33 rotates air from the atmosphere outside the cooling compartment 11 is drawn in through the louvered opening 34 and passed over the condenser 35 and, in a brushing or sweeping fashion, into contact with the outer surfaces of the compressor 39 and driving engine 41 after which it is evacuated back into the outside atmosphere by way of louvered opening 32. In this way the condenser is cooled by the outside atmosphere as are also the compressor and its driving engine. In similar fashion rotation of the blower wheel 27 brings air from the space to be cooled or compartment 11 into the shroud 23 and then into heat exchange relation with the cooled evaporator 34 where the heat is removed and after which said air is discharged back into the cooled compartment 11 at a reduced temperature.

From the foregoing it will be readily apparent that the present invention provides a compact, self-contained refrigeration unit that is self-contained, since the motivating power therefor requires no external connection or linkage, and which is highly adaptable for use with either a mobile or portable compartment, or with a stationary space, to be cooled. In addition such an assembly is readily and easily removable as a unitary structure so as to facilitate the repair or replacement of any of the components thereof. Furthermore, this invention is extremely well adapted for use as a closure member or a door for the refrigerator compartment of an automotive vehicle and, when so employed, all portions thereof become readily accessible while the arrangement offers the additional advantage in that a minimum of space is taken out of use from the valuable cargo-carrying space of the vehicle. The proposed invention being in the form of a combination rigid thermally insulated panel and cooling unit assembly is substantially portable and replaceable as a unit and thus presents a valuable service feature in support of the use of such equipment.

While only one form of the invention has been shown, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

I claim:

1. In an automotive truck refrigeration unit, the combination, comprising: a thermally insulated wall member hingedly and removably mounted over a cargo-loading and unloading access opening that opens into a cargo-carrying space to be cooled within the truck; air cooling means; air circulating means cooperative with said air cooling means for moving air from the cargo-carrying space to be cooled into heat exchange relation with said air cooling means and thereafter back into the cargo-carrying space to be cooled; said air cooling means and said air circulating means being disposed adjoining the surface of said wall member that faces the cargo-carrying space to be cooled; refrigerating apparatus including a compressor, condenser and self-contained compressor driving engine all disposed adjoining a surface of said wall member that is exterior of the cargo-carrying space to be cooled; air moving means disposed adjacent said refrigerating apparatus and operative to move air from the atmosphere outside the cargo-carrying space to be cooled into heat exchange relation with said refrigerating apparatus and thereafter back into the outside atmosphere; said air circulating means and said air moving means being mounted on a common drive shaft and drivingly connected to said driving engine for operation thereby; and having said insulated wall member, said air cooling means, said air circulating means, and said refrigerating apparatus removable as a unitary assembly from the automotive truck.

2. In a refrigerated truck having an insulated cargo-carrying compartment and a cargo-loading and unloading access opening into said compartment, a removable cooling unit assembly, comprising: a removable thermally insulated panel member hingedly mounted in the cargo-loading and unloading access opening of the cargo-carrying compartment; a shroud-like housing mounted on the upper half portion of the surface of the panel facing the cargo-carrying compartment and having an air inlet and an air outlet opening therein; a refrigerant evaporator cooling unit and an air circulating element disposed, respectively, adjacent said air outlet and inlet openings, and being enclosed by said housing; said air circulating element being operative to draw air through said air inlet from the cargo-carrying compartment and to pass it into heat exchange relation with said cooling unit and to thereafter discharge the air through said air outlet back into said compartment; a bonnet-like casing mounted on the lower half portion of the exterior surface of the panel and having an air intake opening and an air exhaust opening therein; said casing being fashioned to enclose refrigerating apparatus including a condenser, a compressor and an internal combusion driving engine therefor, and an air moving element mounted therein; said air moving element being operative to draw air through said air intake opening from the atmosphere outside the cargo-carrying compartment and into heat exchange relation with said refrigerating apparatus and thereafter to discharge the air through said air exhaust opening back into the atmosphere outside said compartment; refrigerant-carrying conduits operatively connecting said evaporator cooling unit with said refrigerating apparatus to provide a refrigeration system; said air circulating element and said air moving element being mounted on a common drive shaft and drivingly connected to said driving engine for operation thereby; and having said panel, said housing and the evaporator and air circulating element therewithin, and said casing and the refrigerating apparatus therewithin all rotatable as a unit to permit access through the access opening for loading and unloading of the cargo-carrying compartment and further to permit removal of such components as a unitary structure from the truck.

3. In a refrigerated truck having an insulated cargo-carrying compartment and a cargo-loading and unloading access opening into said compartment, a removable cooling unit assembly comprising: a removable thermally insulated panel member hingedly mounted in the cargo-loading and unloading access opening of the cargo-carrying compartment; a shroud-like housing mounted on the surface of the panel facing the cargo-carrying compartment, and having a plurality of openings therein; a refrigerant evaporator cooling unit and an air circulating element disposed within said housing; said air circulating element being operative to draw air from the cargo-carrying compartment through one of said housing openings and to pass it into heat exchange relation with said cooling unit, and to thereafter discharge the air through another of said housing openings back into said compartment; a bonnet-like casing mounted on the exterior surface of the panel, and having an air intake opening and an air exhaust opening therein; said casing being fashioned to enclose refrigerating apparatus including a condenser, a compressor and an internal combustion driving engine therefor, and an air moving element mounted therein; said air moving element being operative to draw air through said air intake opening from the atmosphere outside the cargo-carrying compartment and pass it into heat exchange relation with said refrigerating apparatus, and thereafter to discharge the air through said air exhaust opening back into the atmosphere outside said compartment; refrigerant-carrying conduits operatively connecting said evaporator cooling unit with said refrigerating apparatus to provide a refrigeration system; said air circulating element and said air moving element being drivingly connected to said driving engine for simultaneous operation thereby; and having said panel, said housing and the evaporator and air circulating element therewithin, and said casing and the refrigerating apparatus therewithin pivotable as a unit to permit access through the access opening for loading and unloading of the cargo-carrying compartment, and further to permit removal of such components as a unitary structure from the truck.

4. In a refrigerated truck having an insulated cargo-carrying compartment and a cargo-loading and unloading access opening into said compartment, a removable cooling unit assembly comprising: a removable thermally insulated panel member hingedly mounted in the cargo-loading and unloading access opening of the cargo-carrying compartment; a shroud-like housing mounted on the surface of the panel facing the cargo-carrying compartment, and having an air inlet and an air outlet therein; a refrigerant evaporator cooling unit and an air circulating element disposed within said housing; said air circulating element being operative to draw air from the cargo-carrying compartment through an air inlet of said housing and to pass it into heat exchange relation with said cooling unit, and to thereafter discharge the air through said air outlet of said housing back into said compartment; a bonnet-like casing mounted on the exterior surface of the panel, and having an air intake opening and an air exhaust opening therein; said casing being fashioned to enclose refrigerating apparatus including a condenser, a compressor and an internal combustion driving engine therefor, and an air moving element mounted therein; said air moving element being operative to draw air through said air intake opening from the atmosphere outside the cargo-carrying compartment and pass it into heat exchange relation with said refrigerating apparatus, and thereafter to discharge the air through said air exhaust opening back into the atmosphere outside said compartment; refrigerant-carrying conduits operatively connecting said evaporator cooling unit with said refrigerating apparatus to provide a refrigeration system; said air circulating element and said air moving element being drivingly connected to said driving engine for operation thereby; and having said panel, said housing and the evaporator and air circulating element therewithin, and said casing and the refrigerating apparatus therewithin swingable as a unit to permit ingress and egress through the access opening for loading and unloading of the cargo-carrying compartment, and further to permit removal of such components as a unitary structure from the truck.

5. In a refrigerated truck having an insulated cargo-carrying compartment and a cargo-loading and unloading access opening into said compartment, a removable cooling unit assembly comprising: a removable thermally insulated door member hingedly mounted in the cargo-loading and unloading access opening of the cargo-carrying compartment; a shroud-like housing mounted on the surface of the door facing the cargo-carrying compartment, and having an air inlet and an air outlet therein; an air cooling unit and an air circulating element disposed within said housing; said air circulating element being operative to draw air from the cargo-carrying compartment through the air inlet of said housing and to pass it into heat exchange relation with said air cooling unit, and to thereafter discharge the air through said air outlet of said housing back into said compartment; a bonnet-like casing mounted on the exterior surface of the door, and having an air intake opening and an air exhaust opening therein; said casing being fashioned to enclose refrigerating apparatus including a condenser, a compressor and and internal combustion driving engine therefor, and an air moving element mounted therein; said air moving element being operative to draw air through said air intake opening from the atmosphere outside the cargo-carrying compartment and into heat exchange relation with said refrigerating apparatus, and thereafter to discharge the air through said air exhaust opening back into the atmosphere outside said compartment; refrigerant-carrying conduits operatively connecting said air cooling unit with said refrigerating apparatus to provide a refrigeration system; said air circulating element and said air moving element being mounted on a common journalling shaft and being drivingly connected to said driving engine for operation thereby; and having said door, said housing and the air cooling unit and air circulating element therewithin, and said casing and the refrigerating apparatus therewithin all movable as a unit to permit ingress and egress through the access opening for loading and unloading of the cargo-carrying compartment, and further to permit removal of such components as a unitary structure from the truck.

References Cited in the file of this patent

UNITED STATES PATENTS

| | | |
|---|---|---|
| 2,028,046 | Calatroni | Jan. 14, 1936 |
| 2,336,735 | Jones | Dec. 14, 1943 |
| 2,466,876 | Brouse | Apr. 12, 1949 |
| 2,630,687 | Acton | Mar. 10, 1953 |